United States Patent [19]

Aumueller et al.

[11] Patent Number: 5,298,592

[45] Date of Patent: Mar. 29, 1994

[54] PREPARATION OF POLYARYL ETHERS WITH NITROGEN COMPOUND CATALYSTS

[75] Inventors: Alexander Aumueller, Neustadt; Wolfgang Eberle, Mainz; Gerhard Heinz, Weisenheim; Bernd Hupfeld, Speyer; Christiane Husemann, Neustadt; Juergen Koch, Neuhofen; Helmut Reichelt, Neustadt, all of Fed. Rep. of Germany

[73] Assignee: BASF Aktiengesellschaft, Ludwigshafen, Fed. Rep. of Germany

[21] Appl. No.: 932,991

[22] Filed: Aug. 20, 1992

[30] Foreign Application Priority Data

Aug. 29, 1991 [DE] Fed. Rep. of Germany ....... 4127507
Sep. 19, 1991 [DE] Fed. Rep. of Germany ....... 4131143

[51] Int. Cl.$^5$ .................................... C08G 65/40
[52] U.S. Cl. .................................... 528/126; 528/125; 528/128; 528/171; 528/174; 528/219
[58] Field of Search ................ 528/126, 125, 128, 171, 528/174, 219

[56] References Cited

U.S. PATENT DOCUMENTS 4,105,636 8/1978 Taylor .................................. 528/126

FOREIGN PATENT DOCUMENTS 001879 5/1979 European Pat. Off. .

Primary Examiner—Harold D. Anderson
Attorney, Agent, or Firm—Keil & Weinkauf

[57] ABSTRACT

A process for preparing polyaryl ethers of the formula I or Ia

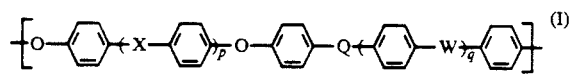

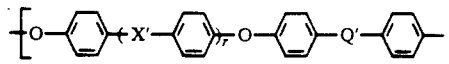

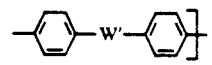

by condensation of at least one appropriate bisphenol with at least one appropriate aromatic dichloride in the presence of an alkali metal carbonate in a dipolar aprotic solvent, is carried out in the presence of a catalyst selected from the alkali metal nitrites and the group of compounds of the formula II

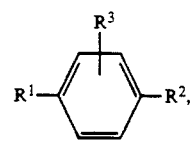

where $r^1$ and $r^3$ are each hydrogen, $C_7$-$C_{16}$-phenylalkyl, $C_1$-$C_{12}$-alkoxy, fluorine, chlorine, bromine, iodine or nitro, and $R^2$ is nitro or nitroso, or

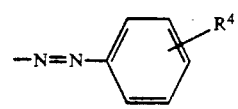

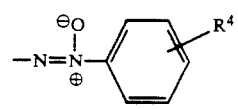

or

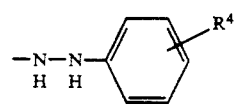

where $R^4$ is hydrogen, $C_1$-$C_4$alkyl, fluorine, chlorine, bromine or iodine.

7 Claims, No Drawings

PREPARATION OF POLYARYL ETHERS WITH NITROGEN COMPOUND CATALYSTS

The present invention relates to a process for preparing aromatic polyether ketones and polyether sulfones.

Polyaryl ethers can be prepared electrophilically as described, for example, in U.S. Pat. No. 4,709,007, U.S. Pat. No. 3,791,890 or DE 1 645 153. Nucleophilic polycondensation of bisphenols with dihaloaromatic compounds to synthesize polyaryl ethers has likewise been disclosed, for example, in U.S. Pat. No. 4,105,636 and EP 1879. Nucleophilic condensation results in high molecular weight polyaryl ether ketones only when the relatively costly difluoro compounds are employed as dihaloaromatic compounds. EP-B-1879 states that part of the difluoro monomers can be replaced by dichloro monomers. DE-A-38 29 283 describes a two-stage process for preparing polyether ketones in which, in a first stage, the total amount of bisphenol and dichloroaromatic compound and, in a second stage, the difluoroaromatic compound are employed for the condensation.

It is an object of the present invention to find a process for preparing polyaryl ethers from bisphenols and dichloroaromatic compounds with the addition of catalysts without using corresponding difluoro compounds.

We have found that this object is achieved when the polycondensation of bisphenols and dichloroaromatic compounds to give high molecular weight compounds is carried out in the presence of certain nitrogen compounds.

The compounds obtained with the addition according to the invention have higher molecular weights than without the addition, under conditions which are otherwise the same, as the following comparison shows.

The present invention particularly relates to a process for preparing polyaryl ethers of the formula I or Ia

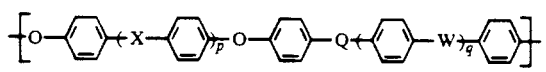

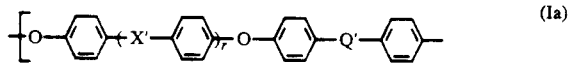

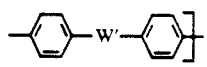

by condensation of at least one appropriate bisphenol with at least one appropriate aromatic dichloride in the presence of an alkali metal carbonate in a dipolar aprotic solvent, which process is carried out in the presence of a catalyst selected from the alkali metal nitrites and the group of compounds of the formula II

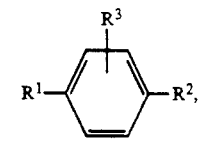

where $R^1$ and $r^3$ are each hydrogen, $C_7$–$C_{16}$-phenylalkyl, $C_1$–$C_{12}$-alkoxy, fluorine, chlorine, bromine, iodine or nitro, and $r^2$ is nitro or nitroso, or

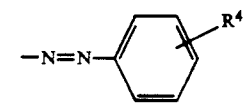

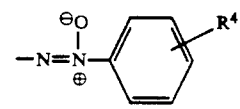

or

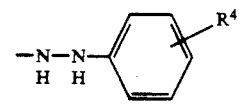

where $R^4$ is hydrogen, $C_1$–$C_4$-alkyl, fluorine, chlorine, bromine or iodine.

If $R^2$ is nitro or nitroso, at least one of $r^1$ or $R^3$ must be halogen such as fluorine, chlorine, bromine or iodine.

the effective amount of alkali metal nitrite is, for example, from 5 to 50 mol %, based on the dichloride, preferably 10 to 40 mol % and particularly preferably 12 to 30 mol %.

Of the other nitrogen compounds generally from 1 to 20 mol %, based on the dichloride, preferably 2 to 15 mol % are required.

The polycondensation of the bisphenol with the dichloroaromatic compound otherwise substantially corresponds to the conventional process, ie. the compounds are reacted in the stoichiometric amount at from 130° to 400° C. in a dipolar aprotic solvent in the presence of an alkali metal carbonate and of the catalyst according to the invention. The resulting polyaryl ethers are composed of up to 100 mol % of units of the formula I

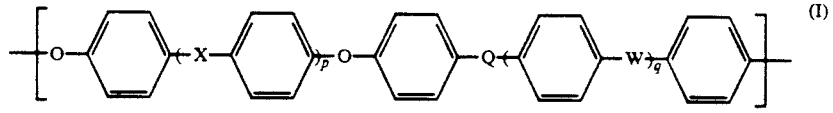

and/or up to 100 mol % of units of the formula Ia

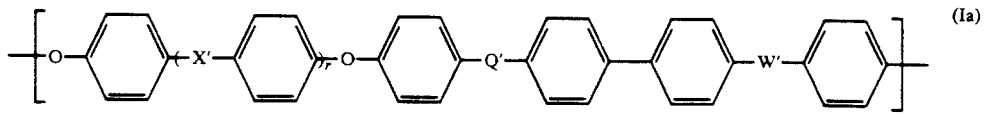

where X,X', Q,Q', W and W' can each, independently of one another, be —SO₂—, —O—, —CO—, a bond or —CRR'—, R and R' are each hydrogen, $C_1$–$C_8$-alkyl or $C_1$–$C_6$-alkoxy, aryl or fluoro or chloro derivatives thereof, and p, q and r are each 0 to 1, or the nuclear-substituted $C_1$–$C_6$-alkyl or $C_1$–$C_6$-alkoxy, aryl, chloro or fluoro derivatives thereof.

These polyaryl ethers are prepared using, for example, the following monomers.

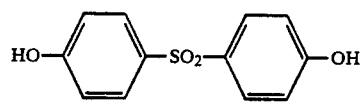

4,4'-dihydroxydiphenyl sulfone

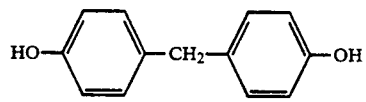

bis(4-hydroxyphenyl)methane

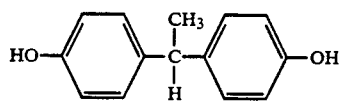

1,1-bis(4-hydroxyphenyl)ethane

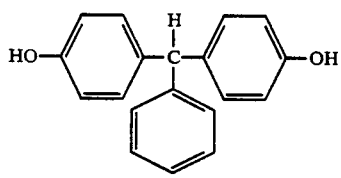

1-phenyl-1,1-bis(4-hydroxyphenyl)-methane

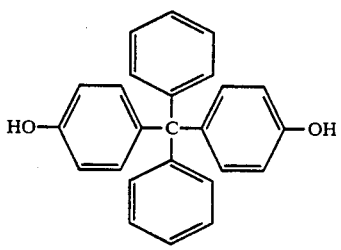

bisphenyl-bis(4-hydroxyphenyl)methane

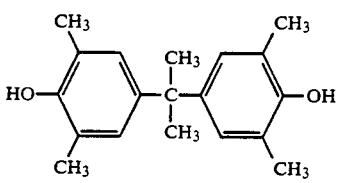

tetramethylbisphenol A

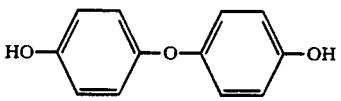

4,4'-dihydroxydiphenyl ether

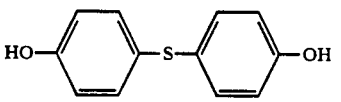

4,4'-dihydroxydiphenyl sulfide

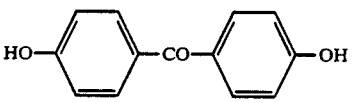

4,4'-dihydroxybenzophenone

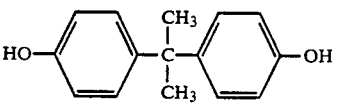

bisphenol A

-continued

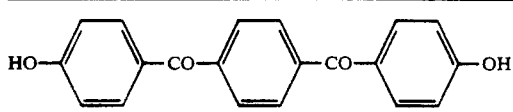
1,4-di(4-hydroxybenzoyl)benzene

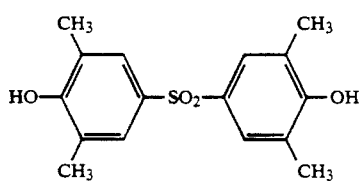
3,3',5,5'-tetramethyl-4,4'-dihydroxydiphenyl sulfone

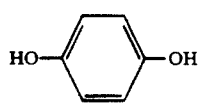
hydroquinone

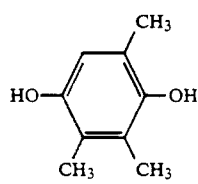
2,3,6-trimethylhydroquinone

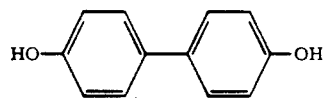
4,4'-dihydroxybiphenyl

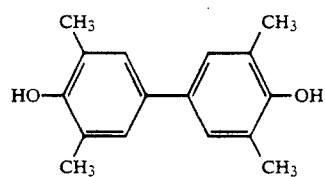
3,3',5,5'-tetramethyl-4,4'-dihydroxybiphenyl

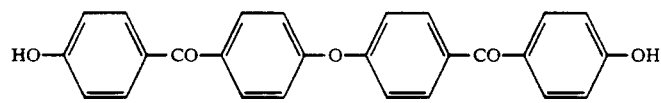
4,4'-bis(4-hydroxybenzoyl)-diphenyl ether

Of the dihydroxy compounds listed above, hydroquinone and 4,4'-dihydroxydiphenyl sulfone are particularly preferred.

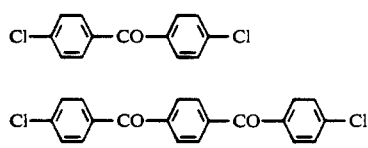
4,4'-dichlorobenzophenone 1,4-bis(4-chlorobenzoyl)-benzene 1,5-dimethyl-2,4-di(4-chlorophenylsulfonyl)-benzene Of the dichloro compounds listed above, 4,4'-bis(4-chlorophenylsulfonyl)biphenyl and dichlorobenzophenone, and the corresponding polycondensates, are particularly preferred.

The following monomers with biphenyl units which are employed to prepare corresponding polymers may be mentioned, merely as representatives:

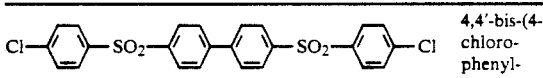
4,4'-bis-(4-chlorophenyl-sulfonyl)-biphenyl

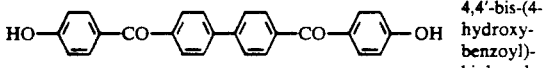
4,4'-bis-(4-hydroxy-benzoyl)-biphenyl

The abovementioned compounds can in principle be reacted together in any desired combination.

The reaction is particularly suitably carried out in dipolar aprotic solvents in the presence of anhydrous alkali metal carbonates. Particularly preferred solvents are N-methylpyrrolidone and, for the preparation of polyether ketones, preferably sulfone solvents, especially diphenyl sulfone. The amount of solvent is generally from 5 to 100 mol, preferably 5 to 20 mol, based on 1 mol of monomer. This results in a preferred solids content in the range from 5 to 50 % by weight, particularly preferably 10 to 40 % by weight, in the reaction mixture.

The water produced in the polycondensation can be removed with the aid of an entraining agent, by reducing the pressure or, preferably, by passing in nitrogen and distilling out. Suitable entraining agents are all compounds which boil in the region of the reaction temperature under atmospheric pressure and which mix with the reaction mixture without undergoing chemical reactions.

The reaction temperature for the preparation of polyaryl ether sulfones is generally in the range from 130° to 220° C., preferably from 150° to 210° C.; the total reaction time depends on the required degree of condensation but is generally in the range from 0.1 to 15 hours.

To prepare polyaryl ether ketones, generally higher temperatures in the range from 150° to 400° C., in particular 200° to 350° C., are necessary. It is advantageous to increase the temperature stepwise.

Following the polycondensation it is possible to stabilize free phenol end groups by reaction with an alkylating or arylating agent such as methyl chloride or 4-fluorobenzophenone.

The alkali metal chloride which is formed can be removed using suitable apparatus, for example clarifying filter or centrifuge.

It is also possible to convert the melt into a finely divided material which is extracted with a suitable solvent (eg. acetone) or a solvent mixture such as a methanol/acetone mixture, to remove residual solvent (eg. diphenyl sulfone). It is subsequently possible to remove the alkali metal chloride which has been produced by extraction with water.

The following preliminary remarks are necessary to explain the following examples and the table.

In the case of the polyaryl ether ketones, the inherent viscosity $$\eta_{inh.} = \frac{\ln \eta_{rel.}}{C}$$

is used, with the unit dl/g.

The measurements are carried out on a 0.5% strength solution in concentrated sulfuric acid at 250° C.

In the case of the polyaryl ether sulfones, the reduced viscosity $$\eta_{red.} = \frac{\eta_{rel.} - 1}{C}$$

is used, with the unit dl/g.

The measurements are carried out on a 0.5 % strength solution in concentrated sulfuric acid at 25° C.

EXAMPLE 1

200 g of diphenyl sulfone, 142.10 g of 4,4'-(bis(4-chlorobenzoyl)benzene, 44.00 g of hydroquinone, 42.29 g of sodium carbonate, 2.90 g of potassium carbonate and 5.1 g of potassium nitrite were introduced into a 1 l three-neck flask with stirrer, distillation apparatus and nitrogen introduction tube, which was flushed with nitrogen. The mixture is heated at 250° C. for 2.5 h and at 330° C. for 5 h while passing in N₂. The water is removed by distillation. The mixture is cooled and ground, and extracted with acetone and then with water. The residue is dried at 200° C.

In the comparative test, Example 1 is repeated but without the addition of potassium nitrite.

EXAMPLE 2

300 g of diphenyl sulfone, 151.41 g of 4,4'-dichlorobenzophenone, 66.00 g of hydroquinone, 85.41 g of potassium carbonate and 7.70 g of potassium nitrite were introduced into a 1 l three-neck flask with stirrer, distillation apparatus and nitrogen introduction tube, which was flushed with nitrogen and then heated at 200° C. for 1.5 h, at 250° C. for 1 h and at 330° C. for 3 h while passing in N₂. The mixture is cooled and ground, and extracted with acetone and then with water. The residue is dried at 200° C.

A comparative test without potassium nitrite is carried out in this case too.

EXAMPLE 3

The process is carried out as described above but with heating at 200° C. for 1.5 h, at 200° C. for 1 h and at 300° C. for 1 h. Comparison without added nitrite.

| Example | Catalyst | Temperature | $\eta_{inh}$ · (dl/g)*) | Polymer type |
|---|---|---|---|---|
| 1 | KNO₂ | 2.5 h 250° C., 5 h 330° C. | 1.05 | PEEKK |
| Comparative | — | 2.5 h 250° C., 5 h 330° C. | 0.80 | PEEKK |
| 2 | KNO₂ | 1.5 h 200° C., 1 h 250° C. 3 h 330° C. | 1.20 | PEEK |
| Comparative | — | 1.5 h 200° C., 1 h 250° C. 3 h 330° C. | 0.84 | PEEK |
| 3 | KNO₂ | 1.5 h 200° C., 1 h 250° C. 3 h 300° C. | 0.92 | PEEK |
| Comparative | — | 1.5 h 200° C., 1 h 250° C. 3 h 300° C. | 0.49 | PEEK |

*)measured on 0.5% strength solution in concentrated H₂SO₄ at 25° C.

EXAMPLE 4

259.26 g of 4,4'-bis(4-chlorophenylsulfonyl)biphenyl (prepared from 4-chlorobenzenesulfonyl chloride and biphenyl in 1,2-dichlorobenzene as solvent), 125.14 g of 4,4'-dihydroxydiphenyl sulfone, 76.0 g of potassium carbonate, 7.93 g of azoxybenzene and 1 l of N-methylpyrrolidone are heated at 190° C. under nitrogen. Most of the water which has formed is distilled out within one hour. The mixture is then stirred at 190° C. for a further 5 h, and the product is removed by precipitation with water, washed and dried at 120° C. The resulting polyaryl ether has a reduced viscosity of 0.73 dl/g measured at 1 % strength solution in N-methylpyrrolidone at 25° C.

If the process is carried out correspondingly but without the addition of azoxybenzene, the reaction product has a reduced viscosity of 0.19 dl/g.

We claim:

1. A process for preparing polyaryl ethers having repeating units of the formula I or IA

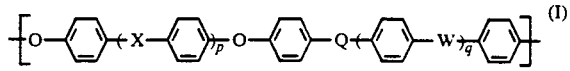

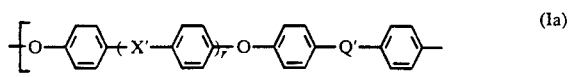

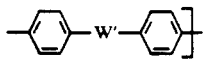

or the corresponding nuclear-substituted $C_1$-$C_6$-alkyl or $c_1$-$C_6$-alkoxy, aryl, chloro, fluoro substituted repeat units, where X, X', Q, Q', W and W' each independently of one another is a bond or X, X', Q, Q', W and W' represent a divalent radical selected of the group—$SO_2$—, —O—, —CO—and —CRR' where R and R' are each hydrogen, $C_1$-$C_6$-alkyl, $C_1$-$C_6$-alkoxy, aryl or fluoro or chloro derivatives thereof and p, q and r each 0 or 1, which process comprises: polycondensing at least one appropriate bisphenol with at least one appropriate aromatic dichloride in the presence of an alkali metal carbonate in a dipolar aprotic solvent, in the presence of a catalyst comprising an alkali metal nitrite or a mixture of the alkali metal nitrite and a compound of the formula II

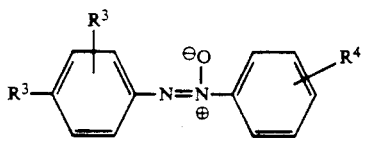

II where $R^3$ is hydrogen, $C_7$-$C_{16}$-phenylalkyl, $C_1$-$C_{12}$-alkoxy, fluorine, chloride, bromine, iodine or nitro, and $R^4$ is hydrogen, $C_1$-$C_4$-alkyl, fluorine, chlorine, bromine or iodine.

2. A process for preparing polyaryl ethers having repeating units of the formula I or IA

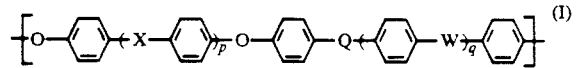

(I)

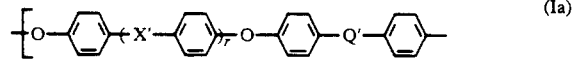

(Ia)

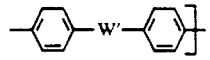

or the corresponding nuclear-substituted $c_1$-$C_6$-alkyl or $C_1$-$C_6$-alkoxy, aryl, chloro, fluoro substituted repeats units, where X, X', Q, Q', W and W' each independently of one another is a bond or X, X', Q, Q', W and W' represent a divalent radical selected of the group—$SO_2$—, —O—, —CO—and —CRR' where R and R' are each hydrogen, $C_1$-$C_6$-alkyl, $C_1$-$C_6$-alkoxy, aryl or fluoro or chloro derivatives thereof and p, q and r each 0 or 1, which process comprises: polycondensing at least one appropriate bisphenol with at least one appropriate aromatic dichloride in the presence of an alkali metal carbonate in a dipolar aprotic solvent, in the presence of a catalyst comprising a compound of the formula II

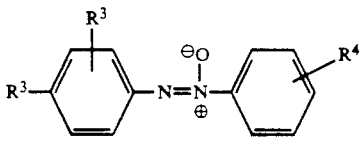

II where $r^3$ is hydrogen, $C_7$-$C_{16}$-phenylalkyl, $C_1$-$C_{12}$-alkoxy, fluorine, chloride, bromine, iodine or nitro, and $R^4$ is hydrogen, $C_1$-$C_4$-alkyl, fluorine, chlorine, bromine or iodine.

3. The process of claim 1 comprising poly condensing in the presence of potassium nitrite.

4. The process of claim 1 comprising poly condensing in the presence of azoxybenzene.

5. The process of claim 1 comprising poly condensing in the presence of from 5 to 50 mol %, based on the aromatic dichloride or alkali metal nitrite.

6. The process of claim 1 wherein compound II is present in an amount of from 1 to 20 mol %, based on the aromatic dichloride.

7. The process of claim 1 wherein N-methyl-pyrrolidone is the dipolar aprotic solvent.

* * * * *

UNITED STATES PATENT AND TRADEMARK OFFICE
CERTIFICATE OF CORRECTION

PATENT NO. : 5,298,592
DATED : March 29, 1994
INVENTOR(S) : AUMUELLER et al.

It is certified that error appears in the above-indentified patent and that said Letters Patent is hereby corrected as shown below:

In the Abstract, right-hand column, first line after formula II, "$r^1$ and $r^3$" should be --$R^1$ and $R^3$--

Claim 1, column 9, line 7, "$c_1$" should be --$C_1$--

Claim 2, column 9, line 35, "IA" should be --Ia--

Claim 2, column 10, line 6, "$c_1$" should be --$C_1$--

Claim 2, column 10, line 28, "$r^3$" should be --$R^3$--.

Signed and Sealed this

Sixteenth Day of August, 1994

BRUCE LEHMAN

*Attest:*

*Attesting Officer*   *Commissioner of Patents and Trademarks*